(12) United States Patent
Halme et al.

(10) Patent No.: US 6,637,532 B2
(45) Date of Patent: Oct. 28, 2003

(54) METHOD IN WORKING MACHINE

(75) Inventors: Jarkko Halme, Lempäälä (FI); Jukka Koski, Lempäälä (FI); Tapio Laakso, Ruutana (FI); Mika Talola, Tampere (FI)

(73) Assignee: Timberjack Oy, Tampere (FI)

( * ) Notice: Subject to any disclaimer, the term of this patent is extended or adjusted under 35 U.S.C. 154(b) by 88 days.

(21) Appl. No.: 10/035,611

(22) Filed: Oct. 19, 2001

(65) Prior Publication Data

US 2002/0053442 A1 May 9, 2002

(30) Foreign Application Priority Data

Oct. 24, 2000 (FI) ............................... 20002338

(51) Int. Cl.$^7$ ................................. B62D 33/06
(52) U.S. Cl. ................................... 180/89.13
(58) Field of Search ............... 180/89.1, 89.12, 180/89.13, 89.14; 296/190.01, 190.04, 190.05; 212/291; 414/687, 699

(56) References Cited

U.S. PATENT DOCUMENTS

| | | | |
|---|---|---|---|
| 3,568,778 A | | 3/1971 | Swisher et al. |
| 3,606,047 A | | 9/1971 | Schaeff |
| 3,807,586 A | * | 4/1974 | Holopainen ............... 414/694 |
| 4,200,315 A | * | 4/1980 | Carlsson ................... 280/492 |
| 4,506,792 A | * | 3/1985 | Hedlund et al. ........... 212/223 |

FOREIGN PATENT DOCUMENTS

| | | |
|---|---|---|
| DE | 3817645 A1 | 11/1989 |
| FI | 820863 | 9/1982 |
| FI | 820864 | 9/1982 |
| GB | 1538345 A | 1/1979 |

OTHER PUBLICATIONS

European Search Report for corresponding European Application No. 01660195.7–2316, Dated Feb. 5, 2002.

* cited by examiner

*Primary Examiner*—Paul N. Dickson
*Assistant Examiner*—Faye M. Fleming
(74) *Attorney, Agent, or Firm*—Quarles & Brady LLP

(57) ABSTRACT

A method in a working machine, comprising a frame movable by means of a wheelwork, the frame provided with a boom assembly movable around a first pivot point in a first angle sector. The free end of the boom assembly is provided with equipment for work performances to be carried out with the working machine, and the frame is provided with a cabin for the operator of the working machine, movable around a second pivot point in a second angle sector. To synchronize the movements of the boom assembly and the cabin, for the purpose of optimizing the number of movements of the cabin during successive work performances performed by the equipment, a monitoring angle sector is selected for the cabin. The cabin is kept stationary, if the equipment is in the monitoring angle sector. After this, the cabin is moved to a new location of a new monitoring angle sector, if the equipment moves out of the location of the preceding monitoring angle sector.

19 Claims, 2 Drawing Sheets

METHOD IN WORKING MACHINE

BACKGROUND OF THE INVENTION

1. Field of the Invention

The invention relates to a method in a working machine with a frame movable by means of a wheelwork, in connection with which frame a cabin equipped with a seat or the like is placed for the operator of the working machine, as well as a boom assembly movable around a first pivot point in a first angle sector, the free end of the boom assembly being provided with equipment for work performances to be carried out with the working machine, wherein the cabin and/or the seat or the like for the operator of the working machine is arranged to be movable around a second pivot point in a second angle sector.

2. Description of the Related Art

Particularly, but not solely, the method according to the invention is intended for use in forest working machines, such as forwarder, harvesters, harvester forwarders used as their combination, and tree-planting machines, whose basic construction is similar to that described in the preceding paragraph. Thus, both the boom assembly and the cabin and/or the seat or the like for the operator of the machine in the cabin are connected to the frame of the working machine in such a way that the boom assembly, on one hand, and the cabin and/or the seat for the operator of the machine in the cabin, on the other hand, can be rotated, irrespective of each other, around substantially vertical rotation axes (first and second pivot points). The operator of the working machine in the cabin must monitor the equipment located at the end of the boom assembly and performing movements in a wide sector as the work performances proceed, wherein the cabin is normally arranged, according to most current solutions, to continuously follow the movement of the equipment. As a result, the working conditions are not satisfactory for the operator of the working machine, because the cabin is in a continuous rotary motion during the work performances, the cabin following the movements of the equipment at the end of the boom assembly.

SUMMARY OF THE INVENTION

The aim of the present invention is to disclose a method in a working machine, whereby it is possible to avoid the drawbacks of prior art and thereby to achieve a functional system which provides, on one hand, efficient work performances and, on the other hand, advantageous working conditions for the operator of the working machine. To achieve these aims, the method according to the invention is primarily characterized in that, to synchronize the movements by the boom assembly and by the operator of the working machine, particularly for the purpose of optimizing the number of movements by the operator of the working machine during successive work performances based on the movements of the boom assembly and to be performed by the equipment, the following steps are taken:

selecting a monitoring angle sector, or the like, for the operator of the working machine, as well as a location for the monitoring angle sector, in such a way that the equipment is situated in the monitoring angle sector, keeping the operator of the working machine stationary, if the equipment is in the monitoring angle sector during the work performances, and moving the operator of the working machine into a new location for a monitoring angle sector in such a way that the equipment is in the new monitoring angle sector, if the equipment moves outside the preceding monitoring angle sector.

When the equipment at the end of the boom assembly carries out work performances, for example felling, delimbing and cutting of a tree in the harvester application, in a specific, selected monitoring angle sector, cutting normally to a specific point of collection, the frontal direction of the operator of the working machine, i.e. the cabin and the seat or the like for the operator of the working machine, is normally stationary in relation to the frame of the working machine. Thus, the operator of the working machine, sitting in the cabin of the working machine, has control over all the parts of the work performance which require visual perception, substantially by eye movements and, if necessary, also by lateral movements of the head in relation to the body. If the equipment moves outside the monitoring angle sector, the frontal direction of the operator of the working machine, i.e. the cabin and/or the seat or the like for the operator of the working machine, is moved by rotating around the second pivot point into a new position, wherein also the direction of the monitoring angle sector is naturally changed and, in this new position of the monitoring angle sector, new work performances are carried out with the equipment, the frontal direction of the operator of the working machine being stationary. In this description, the frontal direction refers to the direction which joins the direction of the bisectrix of the monitoring angle sector and which faces directly forward, the human body being placed symmetrically in relation to the vertical central line of the body, i.e. in a sitting position. The vertex of the monitoring angle sector is substantially at the second pivot point, and the sides limiting the monitoring angle sector are formed by two imaginary vertical planes and extend from the vertex of the sector at an angle to the frontal direction.

According to a particularly advantageous embodiment, the movement of the operator of the working machine is started with the aim of placing the operator of the working machine into a new position of the monitoring angle sector, substantially simultaneously and in parallel with the direction of movement of the equipment, when the equipment moves outside the preceding position of the monitoring angle sector. With this solution, the operation of selecting a new monitoring angle sector can be immediately started, and it is also secured that the operator of the working machine can, in an advantageous working position, maintain a visual contact with the equipment which moved out of the preceding monitoring angle sector.

According to an important application, a new position of the monitoring angle sector is selected for the operator of the working machine, when it is detected that the movement of the equipment outside the preceding monitoring angle sector complies with the definition of a selection parameter set for selecting the new monitoring angle sector. According to the first alternative of the above embodiment, the first selection parameter, and thereby the point on the basis of which the position for new monitoring angle sector is selected, is selected to be the point at which the equipment and the monitoring angle sector of the operator of the working machine, following the movement of the equipment, preferably a side of the monitoring angle sector, meet, if A) the direction of transfer of the equipment moved outside the preceding monitoring angle sector, which is stationary in relation to the frame of the working machine, is changed, and B) if the equipment and the monitoring angle sector of the operator of the working machine, following the movement of the equipment, preferably a side of the monitoring angle sector, meet. Furthermore, according to a second alternative of the application, the second selection parameter is selected to be the combination of a) selected minimum speed of the equipment and b) selected time of movement of the equipment at the minimum speed at the most, wherein C) if the equipment moves at the selected minimum speed, at the most, and D) if the duration of the movement performed at said minimum speed is at least the selected time, the position for the new monitoring angle sector is selected on the basis of the position satisfying the steps C) and D) of the equipment. Typically, a situation in which the definitions for the selection parameter are fulfilled, is, in the harvester application, the step of gripping a tree to be felled next, or the transfer of a felled tree trunk to a processing location. With these alternative definitions for the selection parameter, it is possible to control the situations of selecting the position for the new monitoring angle sector after the equipment has moved outside the preceding monitoring angle sector.

The appended other dependent claims related to the method present some other advantageous embodiments of the method according to the invention.

BRIEF DESCRIPTION OF THE DRAWINGS

In the following specification, the method according to the invention will be described in more detail with reference to the embodiment shown in the appended drawing. In the drawing.

DETAILED DESCRIPTION OF THE INVENTION

Figure 1:
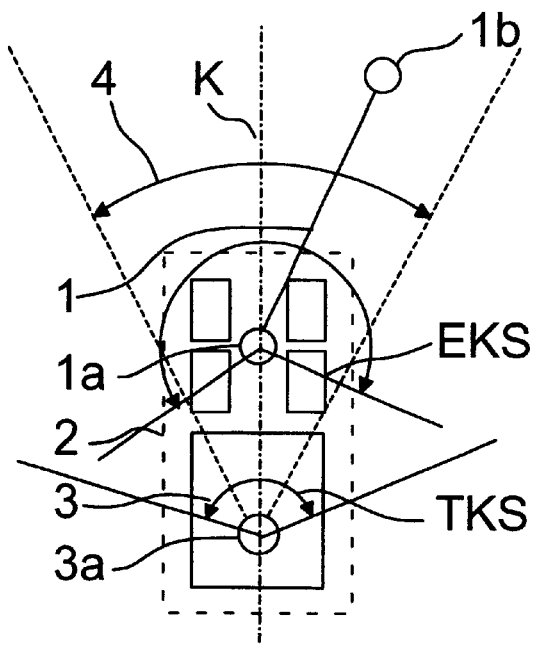
FIG. 1 shows schematically, seen from above, the normal application of the method, wherein a boom assembly and equipment at its end are placed in a monitoring angle sector, and a cabin and/or a seat or the like in the cabin is stationary.

In the following description, the method according to the invention will be illustrated according to an embodiment based solely on the movements of the cabin. It is obvious that corresponding functions can be implemented in an analog way with a movable seat or the like in a working machine equipped with a stationary cabin, as well as with a combination of a movable cabin and a movable seat or the like.

In FIGS. 1 to 4, reference numeral 1 indicates a boom assembly which is connected at its first end to the frame 2 of a working machine, such as a forest machine (shown schematically with broken lines in FIGS. 1 to 4). The method according to the invention is based on the fact that during the application of the method, the frame 2 is substantially immovable and stationary in relation to the terrain. When the frame 2 of the working machine is transferred to the next working location, the application of the method can be continued within the scope of the possibilities offered by said working location. In a corresponding manner, the cabin 3 is also connected to the frame 2 of the working machine. The frame 2 is equipped with a wheelwork for moving on a terrain. Working machine applications of this kind, particularly forest machine applications, are commonly known, wherein their detailed construction does not need to be described more closely in this context, but reference is made to patents in the field.

The boom assembly 1 is connected to the frame 2 to be movable around the first vertical pivot point 1a in a first angle sector EKS. Taking the central line K in the longitudinal direction of the frame 2 in FIG. 1 as the reference line, the first angle sector EKS, in relation to the central line K of the boom assembly 1, normally ranges from ±95° to ±120°. The free end of the boom assembly 1 is provided with equipment 1b for work performances to be carried out with the working machine. In forest machine applications, this equipment 1b may be a grapple, a harvester, a harvester grapple used as a combination of these, or a tree-planting unit, according to the use.

The cabin 3, in turn, is arranged to be movable by rotating around the second vertical pivot point 3a in a second angle sector TKS. According to normal practice, the cabin 3 is provided with a seat for the operator of the working machine, the seat being fixed or similarly arranged to be rotatable around the second vertical pivot point 3a. The cabin 3 is equipped with a wall structure which is transparent in its substantial parts. The second angle sector TKS normally ranges from ±45° to ±90° in relation to said central line K. According to the basic idea of the invention, a monitoring angle sector 4 is selected for the cabin 3, which sector can be selected according to the work performance or the use of the working machine. Normally, the sector angle of the monitoring angle sector ranges from 10° to 110°, advantageously from 35° to 80° and preferably from 25° to 60°.

FIG. 1 shows a normal situation of applying work performances, wherein the equipment 1b is placed in the monitoring angle sector 4 corresponding to the location of the cabin 3, and the cabin 3 is stationary. The equipment 1b can now be used for carrying out all work performances, wherein these work performances, to be carried out by means of these control devices in connection with the seat, are monitored in such a way that the operator of the working machine watches the movements of the equipment 1b in the monitoring angle sector 4 by maintaining a visual contact with it, possibly helping with movements of his head.

Figure 2:
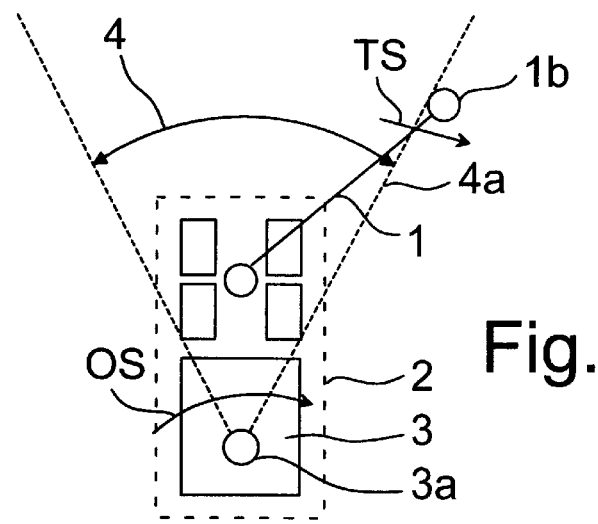
FIG. 2 shows schematically, seen from above, a situation of applying the method, in which the equipment at the end of the boom assembly has moved outside the monitoring angle sector, and the transfer of the cabin and/or the seat or the like in the cabin is started.

When, in the situation of FIG. 1, the performance has proceeded to the step in which, in view of the procedure of the overall work performance, it is necessary to move out of the monitoring angle sector 4, a shift is made, for example, to the situation of FIG. 2, in which the equipment 1b at the end of the boom assembly 1 has moved, seen from above the (preceding) monitoring angle sector 4, across the right side 4a. This shift can be detected by a suitable sensor technique whereby, first of all, the magnitude of the monitoring angle sector is selected in the cabin 3 and, on the other hand, by placing a suitable sensor in connection with the boom assembly and/or the equipment 1b. According to an advantageous embodiment of the invention, the movement of the operator of the working machine is started, with the aim of achieving a new monitoring angle sector, substantially simultaneously and in parallel with the direction of the movement of the equipment 1b (arrow OS, clockwise rotation of the cabin 3 in FIG. 2), when the equipment 1b moves outside the location of the preceding monitoring angle sector 4.

Figure 3A:
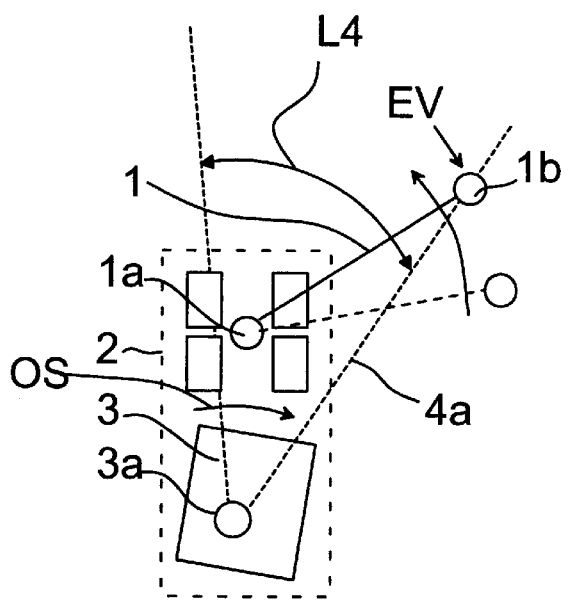
FIG. 3a shows schematically, seen from above, a situation, in which the equipment at the end of the boom assembly has, after its movement outside the preceding monitoring angle sector, changed its direction of motion to the opposite and meets the side of the monitoring angle sector moving with the movement of the cabin and/or the seat or the like in the cabin, FIG. 3b, in turn, shows, also schematically and seen from above, a situation in which the equipment at the end of the boom assembly has moved, for example substantially in the same direction after it has exited the preceding monitoring angle sector, and the value for determining the selection parameter has been fulfilled (e.g. the stage of starting a new work performance), wherein the cabin and/or the seat or the like in the cabin is, according to the selected way of directing the monitoring angle sector, stopped to a new monitoring angle sector position.
Figure 3B:
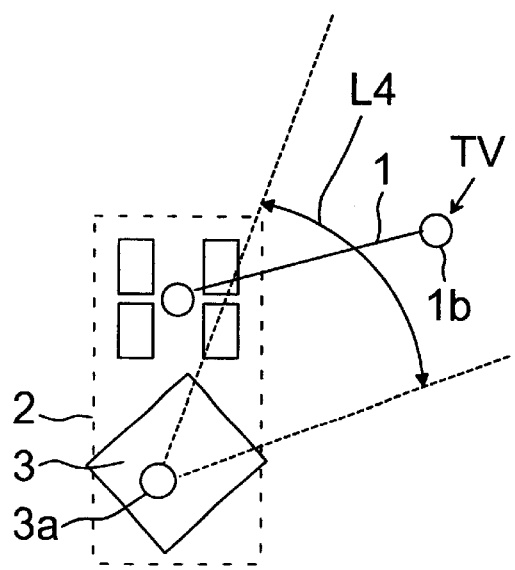

From the mutual position of the locations of the equipment 1b and the preceding monitoring angle sector 4 in FIG. 2, the next step, according to further movements of the equipment 1b which meet the requirements of the work performances, is to proceed to situations shown by either FIG. 3a or FIG. 3b. Thus, a new location is selected for the monitoring angle sector 4' of the operator of the working machine, when it is detected that the movement of the equipment 1b outside the preceding monitoring angle sector 4 fulfills the definition of the selection parameter.

According to FIG. 3a, the first selection parameter and thereby the selection criterion for the location of the new monitoring angle sector 4' is selected to be the point of intersection between the equipment 1b, on one hand, and the point selected for the monitoring angle sector L4 moving with the operator of the working machine, following the movement of the equipment 1b, preferably the side 4a of the monitoring angle sector L4, on the other hand. This intersection meets the definitions for the first selection criterion, if the direction of movement of the equipment 1b transferred outside the preceding angle sector 4 (FIG. 2) is changed (from the clockwise movement around the first pivot point in FIG. 2 to counter-clockwise according to FIG. 3a) as well as if the equipment 1b and the selected monitoring angle sector L4 following the movement of the equipment 1b and moving with the operator of the working machine meet, i.e. the equipment 1b moves to the range of the monitoring angle sector L4 moving towards it.

According to FIG. 3b, the second selection parameter is selected to be the combination of a) the selected minimum speed of the equipment 1b and b) the selected time when the equipment has moved not faster than at the minimum speed, wherein if the equipment 1b moves not faster than at the selected minimum speed, and if the duration of the movement performed at said minimum speed exceeds the selected time, the position of the equipment 1b is selected as a criterion for selecting a location for the new monitoring angle sector 4'. Thus, in practice, the minimum speed of the equipment 1b is, according to one embodiment, one meter per second (1 m/s; point a), and the time is two seconds (2 s; point b). If the equipment 1b is totally stopped, the time which fulfills the definition for the selection criterion is three seconds (3 s). FIG. 3b shows a situation, in which the equipment 1b is within the range of the moving monitoring angle sector L4 when the definition of the second selection criterion is fulfilled.

Figure 4:
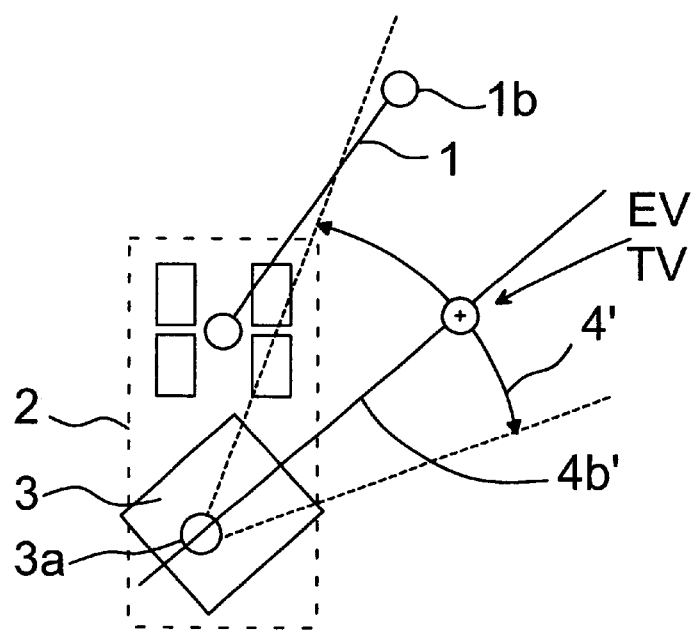
FIG. 4 shows, also schematically and seen from above, work performances to be performed by the equipment at the end of the boom assembly in the new monitoring angle sector position.

When the selection parameter is fulfilled, in the alternatives of FIGS. 3a and 3b, the cabin 3 is moved to a new location of the monitoring angle sector 4' in such a way that the centre of the new, stationary monitoring angle sector 4', preferably the bisectrix 4b' of the sector angle, substantially passes through the point of intersection between the moving monitoring angle sector L4, which fulfills the criteria for the selection parameter of the movement of the equipment 1b outside the preceding monitoring angle sector 4, and the equipment 1b (first selection parameter EV, FIG. 3a), in the range of deceleration or at the end point of the movement of the equipment 1b (second selection parameter TV, FIG. 3b). After the FIGS. 3a and 3b, the working with the working machine is continued as shown in FIG. 4, the cabin 3 being located in the new monitoring angle sector 4' as long as the equipment 1b is placed in the range of the new, stationary monitoring angle sector 4'.

The present invention is not limited solely to the above-presented and exemplified preferred embodiments, but it can be modified within the scope of the appended claims.

What is claimed is:

1. A method in a working machine, comprising a frame movable by means of a wheelwork, the frame provided with a cabin equipped with a seat for the operator of the working machine, as well as a boom assembly movable around a first pivot point in a first angle sector, wherein the free end of the boom assembly is provided with equipment for work performances to be carried out with the working machine, wherein the cabin or the seat is arranged to be movable around a second pivot point in a second angle sector, and wherein, to synchronize the movements of the boom assembly and the operator, for the purpose of optimizing the number of movements of the operator during successive work performances based on the movements of the boom assembly and performed by the equipment, the method comprising the following steps of:

selecting a monitoring angle sector for the operator as well as a location for the monitoring angle sector in such a way that the equipment is situated in the monitoring angle sector, keeping the operator in position, if the equipment is in the monitoring angle sector during the work performances, and moving the operator to a new location for a new monitoring angle sector in such a way that the equipment is in the new monitoring angle sector, if the equipment moves out of the preceding monitoring angle sector.

2. The method according to claim 1, wherein the method further comprises the step of starting the movement of the operator with the aim of placing the operator into the new monitoring angle sector position, substantially simultaneously with and in the same direction as the movement of the equipment, when the equipment moves out of the preceding monitoring angle sector position.

3. The method according to claim 1, wherein the method further comprises the step of selecting the new location for the new monitoring angle sector for the operator, when it is detected that the movement of the equipment outside the preceding monitoring angle sector fulfills the definition of a selection parameter set for the selection of the new monitoring angle sector.

4. The method according to claim 1, wherein the method further comprises the step of selecting as a first selection parameter and thereby as the point, on the basis of which the location of the new monitoring angle sector is selected, a point of intersection between the equipment and the monitoring angle sector moving with the operator, following the movement of the equipment, if A): the direction of movement of the equipment shifted outside the preceding monitoring angle sector is changed, and B): if the equipment and the monitoring angle sector of the operator, following the movement of the equipment, meet.

5. The method according to claim 1, wherein the method further comprises the step of selecting as a second selection parameter the combination of a): selected minimum speed of the equipment, and b): selected time of movement of the equipment at or below the minimum speed, and wherein, step C): if the equipment moves at the selected minimum speed, at the most, and step D): if the duration of the movement performed at said minimum speed is at least the selected time, selecting the position for the new monitoring angle sector on the basis of the position satisfying the steps C) and D) of the equipment.

6. The method according to claim 3, wherein the method further comprises the step of moving the operator to the new location of the new monitoring angle sector in such a way that the center of the new monitoring angle sector of the equipment substantially passes through that location of the equipment which, after the movement of the equipment out of the preceding monitoring angle sector, fulfills the criteria for the selection parameter set for the selection of the new monitoring angle sector.

7. The method according to claim 1, wherein the method further comprises the step of selecting the magnitude for the sector angle for the monitoring angle sector.

8. The method according to claim 1, wherein the method further comprises the step of selecting the sector angle for the monitoring angle sector to range from 10° to 110°.

9. The method according to claim 5, wherein the method further comprises the step of selecting as the second selection parameter the combination of a): the selected minimum speed for the equipment, wherein the minimum speed is one meter per second (1 m/s), and b): the selected time when the equipment has moved not faster than at the minimum speed, wherein the time is at least two seconds (2 s).

10. The method according to claim 5, wherein the method further comprises the steps of selecting as the second selection parameter the combination of a): the selected minimum speed of the equipment, wherein when the minimum speed is zero meters per second (0 m/s), and selecting the time for the part b) for the second selection parameter to be at least three seconds (3 s).

11. The method according to claim 2, wherein the method further comprises the step of selecting the new location for the new monitoring angle sector for the operator, when it is detected that the movement of the equipment outside the preceding monitoring angle sector fulfills the definition of a selection parameter set for the selection of the new monitoring angle sector.

12. The method according to claim 4, wherein the method further comprises the step of moving the operator to the new location of the new monitoring angle sector in such a way that the center of the new monitoring angle sector of the equipment substantially passes through that location of the equipment which, after the movement of the equipment out of the preceding monitoring angle sector, fulfills the criteria for the selection parameter set for the first selection of the new monitoring angle sector.

13. The method according to claim 5, wherein the method further comprises the step of moving the operator to the new location of the new monitoring angle sector in such a way that the center of the new monitoring angle sector of the equipment substantially passes through that location of the equipment which after the movement of the equipment out of the preceding monitoring angle sector, fulfills the criteria for the selection parameter set for the second selection of the new monitoring angle sector.

14. The method according to claim 4, wherein the step of selecting the point of intersection comprises selecting the point of intersection between the equipment and a side of the monitoring angle sector moving with the operator.

15. The method according to claim 6, wherein the center of the new monitoring angle of the equipment is the bisectrix of the section angle.

16. The method as defined in claim 1, wherein the method further comprises the step of selecting the sector angle for the monitoring angle sector in a range from 35° to 80°.

17. The method as defined in claim 1, wherein the method further comprises the step of selecting the sector angle for the monitoring angle sector in a range from 25° to 60°.

18. The method according to claim 12, wherein the center of the new monitoring angle sector of the equipment is the bisectrix of the sector angle.

19. The method according to claim 13, wherein the center of the new monitoring angle sector of the equipment is the bisectrix of the sector angle.

* * * * *